H. Koeller & W. Uecke's Seed Planter

74383

PATENTED FEB 11 1868.

Witnesses.  
W. C. Ashkettle  
Theo. Tuschi

Inventor.  
H. Koeller  
W. Uecke  
per Munn & Co.  
attorneys

United States Patent Office.

HERMANN KOELLER AND WILHELM UECKE, OF CAMP POINT, ILLINOIS.

Letters Patent No. 74,383, dated February 11, 1868.

---

IMPROVEMENT IN HAND SEED-PLANTER.

---

The Schedule referred to in these Letters Patent and making part of the same.

---

TO ALL WHOM IT MAY CONCERN:

Be it known that we, HERMANN KOELLER and WILHELM UECKE, of Camp Point, in the county of Adams, and State of Illinois, have invented a new and improved Hand Seed-Planter; and we do hereby declare that the following is a full, clear, and exact description thereof, which will enable those skilled in the art to make and use the same, reference being had to the accompanying drawings, forming part of this specification, in which—

Similar letters of reference indicate corresponding parts.

This invention relates to a new hand corn or seed-planter, which is so arranged that it can be adjusted to drop larger or smaller quantities of grain at each stroke; and consists mainly in the use of a perforated disk, which receives oscillating motion, and which rests upon a stationary plate that is perforated with one hole.

The holes in the oscillating-disk are of various diameters, and the disk can be set so, above the aforesaid plate, that the seed will be dropped through any one desired hole of the disk, so that as a larger or smaller hole of the latter is brought into operation, a larger or smaller quantity of seed will be dropped during each stroke of the levers by which the disk is oscillated.

The invention also consists in the combination of the aforesaid disk with the crank-shaft and levers by which it is operated, and with the shovels at the lower end of the apparatus, for finally discharging the grain.

Figure 1:
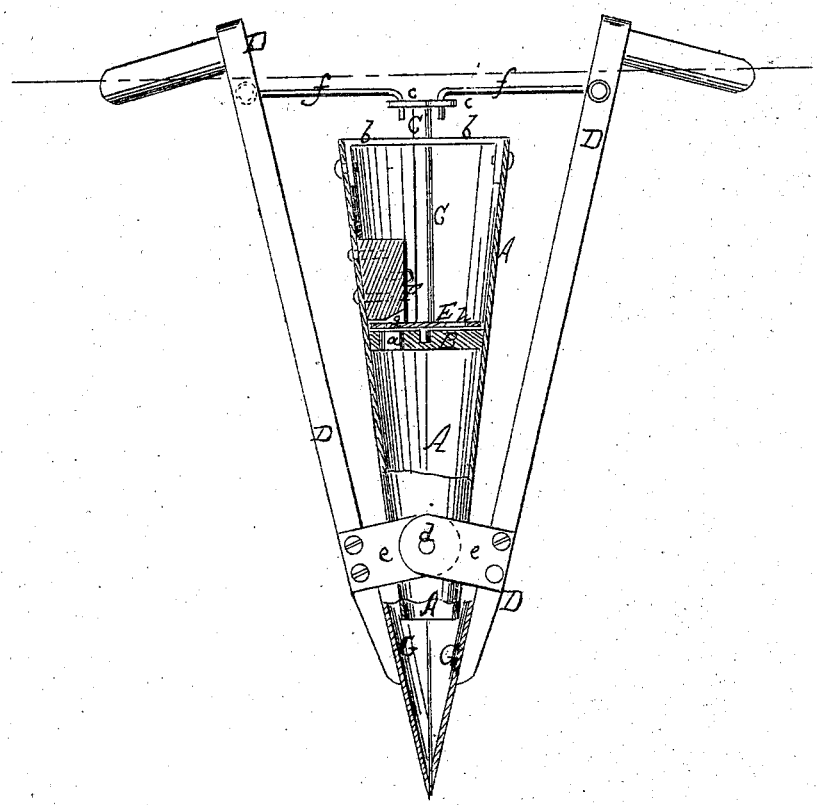
Figure 1 represents a side elevation, partly in section, of our improved hand corn-planter.
Figure 2:
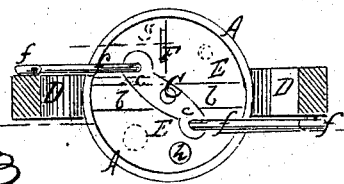
Figure 2 is a plan or top view, partly in section, of the same.

A, in the drawing, represents a hopper of inverted, truncated, conical shape, made of sheet metal or other suitable material, and open on top and bottom. Within the hopper is arranged, near the middle of the same, a horizontal stationary plate, B, made of wood or other suitable material, and perforated with one drop-hole, $a$, as shown. C is an upright shaft, having its bearings in the centre of the plate B and in an arm or arms, $b$, extending across the top of the hopper, as shown. The upper end of the shaft is provided with two or more cranks, $c$ $c$, at least two of which are in the same plane, and on opposite sides of the shaft. D D are two levers, pivoted to the lower part of the hopper by means of a pin, $d$, which fits through arms, $e$ $e$, that extend from the sides of the levers, as is clearly shown in fig. 1. To the upper end of each lever is jointed a rod, $f$, having a hook at its free end, which hooks fit into the cranks $c$ $c$, as shown. Thus, as the levers are moved alternately together and apart, the shaft C will receive oscillating motion. To the lower part of the shaft C is secured a disk, E, fitting close within the hopper, and resting upon the plate B, as shown. This disk E is perforated with two or more holes, $g$ $h$, of different diameters, as shown. One of these holes can be brought in operation at a time. As the shaft is oscillated the hole $g$, which is in operation, will carry the grain under a suitable brush or sweeper, F, to the drop-hole $a$ in the plate B, and will thus drop such a quantity of grain as it can hold to the ground. By reversing the position of the shaft, that is, by fastening the cranks $c$ to the opposite hooks, $f$, the other hole, $h$, will be brought in operation; and if more than one pair of cranks are fitted to the shaft C, more than one pair of holes will be provided in the disk E. The lower ends of the levers D carry semi-conical plates, G G, which, when the upper ends of the levers are drawn apart, will be brought together to form a conical vessel to receive the charge of grain from the hopper; and when the upper ends of the lever are moved towards the hopper, these shovels will be moved apart, and will drop the grain to the ground.

We claim as new, and desire to secure by Letters Patent—

1. The oscillating disk E, when provided with two or more holes, $g$ $h$, of different diameters, and when adjustable on the plate B, having the drop-hole $a$, so that any desired hole of the disk may be employed for measuring and conveying the charge of grain to the drop-hole, substantially as and for the purpose herein shown and described.

2. The oscillating-disk E, when provided with two or more holes, $g$ $h$, of different diameters, in combination with the shaft C and cranks $c$ $c$, hooked rods $f$, and oscillating-levers D D, all made and operating substantially as and for the purpose herein shown and described, and in combination with the shovels G G, made as set forth.

HERMANN KOELLER,
WM. UECKE.

Witnesses:
SAL HUBER,
AUGUST ECKERT.